US007877999B2

(12) United States Patent
Nuel et al.

(10) Patent No.: US 7,877,999 B2
(45) Date of Patent: Feb. 1, 2011

(54) POWER GENERATION AND SPACE CONDITIONING USING A THERMODYNAMIC ENGINE DRIVEN THROUGH ENVIRONMENTAL HEATING AND COOLING

(75) Inventors: Brian P. Nuel, Nederland, CO (US); Lee S. Smith, Boulder, CO (US); Samuel P. Weaver, Boulder, CO (US); Samuel C. Weaver, Knoxville, TN (US); Daniel Weaver, Boulder, CO (US)

(73) Assignee: Cool Energy, Inc., Boulder, CO (US)

( * ) Notice: Subject to any disclaimer, the term of this patent is extended or adjusted under 35 U.S.C. 154(b) by 469 days.

(21) Appl. No.: 11/734,854

(22) Filed: Apr. 13, 2007

(65) Prior Publication Data

US 2008/0250788 A1 Oct. 16, 2008

(51) Int. Cl.
*F01B 29/10* (2006.01)
*F02G 1/04* (2006.01)
*F01K 27/00* (2006.01)
*F01K 1/00* (2006.01)
*F01K 3/00* (2006.01)
*F03G 7/00* (2006.01)
*F03G 6/00* (2006.01)

(52) U.S. Cl. .................. 60/641.13; 60/517; 60/641.1; 60/641.2; 60/659; 60/398

(58) Field of Classification Search .............. 60/641.8, 60/641.11, 641.12, 641.13, 641.14, 641.15, 60/516–526, 398, 641.1, 641.2, 641.6; 126/271, 126/437, 440, 561–713, 714; 62/6, 520; 165/140

See application file for complete search history.

(56) References Cited

U.S. PATENT DOCUMENTS 659,450 A * 10/1900 McHenry ............... 60/641.8
3,006,146 A 10/1961 Jackson (Continued)

FOREIGN PATENT DOCUMENTS

DE 19843600 A1 3/1999

(Continued)

OTHER PUBLICATIONS

Senfit, James R., "An Introduction to Stirling Engines," Moriya Press, 1993, pp. 40-43.

(Continued)

*Primary Examiner*—Thomas E Denion
*Assistant Examiner*—Christopher Jetton
(74) *Attorney, Agent, or Firm*—Townsend and Townsend and Crew LLP

(57) ABSTRACT

A thermodynamic engine is configured to convert heat provided in the form of a temperature difference to a nonheat form of energy. Heat is directed through a heating loop in thermal contact with a first side of the thermodynamic engine. A second side of the thermodynamic engine is coupled to an environmental cooling loop in thermal contact with an environmental cooling device. The thermodynamic engine is operated to dispense heat from the second side of the thermodynamic engine through the environmental cooling loop into the environmental cooling device. Operation of the thermodynamic engine thereby generates the nonheat form of energy from the temperature difference established between the first side and the second side of the thermodynamic engine.

29 Claims, 6 Drawing Sheets

U.S. PATENT DOCUMENTS

| | | | |
|---|---|---|---|
| 3,533,232 A | | 10/1970 | Hodgson |
| 3,638,420 A | | 2/1972 | Kelly et al. |
| 3,772,883 A | | 11/1973 | Davoud et al. |
| 3,858,802 A | * | 1/1975 | Stobart ............... 237/12.1 |
| 3,996,745 A | | 12/1976 | Davoud et al. |
| 4,055,962 A | | 11/1977 | Terry |
| 4,148,195 A | | 4/1979 | Gerstman et al. |
| 4,149,389 A | | 4/1979 | Hayes et al. |
| 4,192,144 A | * | 3/1980 | Pierce ............... 60/641.8 |
| 4,313,304 A | | 2/1982 | Hunt |
| 4,339,930 A | * | 7/1982 | Kirts ............... 62/235.1 |
| 4,362,149 A | * | 12/1982 | Thomson ............... 126/400 |
| 4,455,826 A | * | 6/1984 | Knoos ............... 60/526 |
| 4,532,778 A | | 8/1985 | Clark et al. |
| 4,586,334 A | | 5/1986 | Nilsson, Sr. et al. |
| 4,753,072 A | | 6/1988 | Johansson et al. |
| 4,894,989 A | | 1/1990 | Mizuno et al. |
| 4,897,997 A | | 2/1990 | Meijer et al. |
| 4,977,744 A | * | 12/1990 | Lenz ............... 60/641.15 |
| 5,010,734 A | | 4/1991 | Ho |
| 5,115,157 A | | 5/1992 | Blumenau |
| 5,195,321 A | | 3/1993 | Howard |
| 5,228,293 A | * | 7/1993 | Vitale ............... 60/641.14 |
| 5,428,653 A | | 6/1995 | El-Genk |
| 5,438,846 A | * | 8/1995 | Datta ............... 62/238.7 |
| 5,638,684 A | | 6/1997 | Siegel et al. |
| 5,706,659 A | | 1/1998 | Houtman |
| 5,899,071 A | | 5/1999 | Stone et al. |
| 5,916,140 A | | 6/1999 | Hageman |
| 5,918,463 A | | 7/1999 | Penswick et al. |
| 5,934,076 A | | 8/1999 | Coney |
| 6,305,442 B1 | | 10/2001 | Ovshinsky et al. |
| 6,330,800 B1 | | 12/2001 | Price et al. |
| 6,470,679 B1 | | 10/2002 | Ertle |
| 6,536,207 B1 | | 3/2003 | Kamen et al. |
| 6,606,860 B2 | * | 8/2003 | McFarland ............... 60/648 |
| 6,625,992 B2 | | 9/2003 | Maguire et al. |
| 6,701,721 B1 | | 3/2004 | Berchowitz |
| 6,948,315 B2 | | 9/2005 | Kirby et al. |
| 6,996,988 B1 | * | 2/2006 | Bussard ............... 60/641.8 |
| 7,051,529 B2 | * | 5/2006 | Murphy et al. ............... 60/641.8 |
| 2004/0118449 A1 | * | 6/2004 | Murphy et al. ............... 136/253 |
| 2005/0172623 A1 | | 8/2005 | Hurt |
| 2005/0279094 A1 | | 12/2005 | Yoshino |

FOREIGN PATENT DOCUMENTS

JP          4093559 A      3/1992

OTHER PUBLICATIONS

"Low-Cost Solar-Thermal-Electric Power Generation," author unknown, found online on Jul. 18, 2008 at http://www.cs.berkeley.edu/~artin/Research/research.html, 6 pages.

Der Menassians, Artur, "Stirling Engines for Low-Temperature Solar-Thermal-Electric Power Generation," Written Dissertation from the University of CA Berkeley, 2007, 205 pages.

Der Menassians, Artur, "Stirling Engines for Low-Temperature Solar-Thermal-Electric Power Generation," Dissertation Talk, Nov. 19, 2007, 34 pages.

United States Patent and Trademark Office International Search Report and Written Opinion, Aug. 15, 2008, pp. 1-10, PCT/US2008/059576.

* cited by examiner

POWER GENERATION AND SPACE CONDITIONING USING A THERMODYNAMIC ENGINE DRIVEN THROUGH ENVIRONMENTAL HEATING AND COOLING

BACKGROUND OF THE INVENTION

This application relates generally to power generation. More specifically, this application relates to power generation and space conditioning using a thermodynamic engine driven through environmental heating and cooling.

The use of thermodynamic techniques for converting heat energy into mechanical, electrical, or some other type of energy has a long history. The basic principle by which such techniques function is to provide a large temperature differential across a thermodynamic engine and to convert the heat represented by that temperature differential into a different form of energy. Typically, the heat differential is provided by hydrocarbon combustion, although the use of other techniques is known. Using such systems, power is typically generated with an efficiency of about 30%, although some internal-combustion engines have efficiencies as high as 50% by running at very high temperatures.

Conversion of heat into mechanical energy is typically achieved using an engine like a Stirling engine, which implements a Carnot cycle to convert the thermal energy. The mechanical energy may subsequently be converted to electrical energy using any of a variety of known electromechanical systems. Thermoelectric systems may be used to convert heat into electrical energy directly, although thermoelectric systems are more commonly operated in the opposite direction by using electrical energy to generate a temperature differential in heating or cooling applications.

While various power-generation techniques thus exist in the art, there is still a general need for the development of alternative techniques for generating power. This need is driven at least in part by the wide variety of applications that make use of power generation, some of which have significantly different operational considerations than others.

BRIEF SUMMARY OF THE INVENTION

Embodiments of the invention thus provide methods and system of generating power. A thermodynamic engine is configured to convert heat provided in the form of a temperature difference to a nonheat form of energy. Heat is directed through a heating loop in thermal contact with a first side of the thermodynamic engine. A second side of the thermodynamic engine different from the first side is coupled to an environmental cooling loop in thermal contact with an environmental cooling device. The thermodynamic engine is operated to dispense heat from the second side of the thermodynamic engine through the environmental cooling loop into the environmental cooling device. Operation of the thermodynamic engine thereby generates the nonheat form of energy from the temperature difference established between the first side and the second side of the thermodynamic engine.

In some embodiments, solar radiation is collected and converted to heat to be directed through the heating loop. Waste heat may also sometimes be collected and directed through the heating loop, as may geothermal heat in certain specific embodiments.

In certain embodiments, a portion of the heat is stored in a thermal storage device. This permits heat from the thermal storage device sometimes to be directed through the heating loop. At times, a thermal storage device may also be maintained in thermal contact with the environmental cooling loop. Heat may also sometimes be directed to a supplementary heating function different from the heating loop and different from the thermal storage device. In certain instances, a relative distribution of heat directed through the heating loop, stored in the thermal storage device, and directed to the supplementary heating function may be modified.

Examples of suitable environmental cooling devices that may be used in different embodiments include ground loop chillers, air-radiation devices, building foundations, bodies of water, pavement, and concrete, among others.

In a specific embodiment, the thermodynamic engine comprises a Stirling engine configured to convert the heat provided in the form of the temperature difference to mechanical energy. In such cases, the mechanical energy may subsequently be converted to electrical energy.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figures 1A, 1B, 1C, 1D:
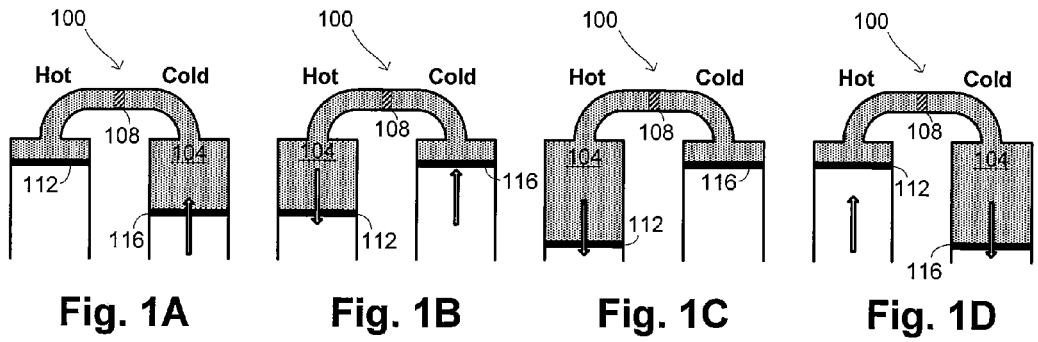
FIGS. 1A-1D show different stages in the operation of a two-piston Stirling engine.

Embodiments of the invention provide generation of power using a thermodynamic engine in which thermal energy is collected and directed in a heating loop that heats one side of the engine and in which the heat rejected from the engine is directed in a cooling loop that disperses the heat into an environmental cooling device. As such, these embodiments make use of a combination of environmental heating and environmental cooling to generate energy with the thermodynamic engine.

In many of the embodiments, the source of environmental heating comprises radiant solar energy. As is well known, the energy provided by the sun on the Earth is abundant so that history is replete with examples of using such radiant energy in a variety of different applications. For instance, human beings have used incoming solar radiation to heat water and living spaces throughout history. More recently, the techniques by which such solar energy is harnessed have become more sophisticated. Many active systems have been developed and marketed to capture solar energy. The heat provided by such energy is typically stored in a fluid thermal storage system and distributed to other locations where heat is required.

In recent times, solar energy has also been successfully used in generating electricity on a commercial level. Certain of the techniques used in doing so are sometimes referred to collectively in the art as providing "concentrated solar power." These techniques typically use a shaped collector to concentrate the sun's ray and thereby produce temperatures high enough to produce steam, which is then passed through a steam turbine to generate electricity. Other methods of generating electricity from radiant solar energy make use of photovoltaic cells. Such systems have been widely used in many commercial and aerospace applications, and are gaining popularity in household electricity generation for both grid-tied and off-the-grid applications.

While different embodiments of the invention make use of different kinds of thermodynamic engines in combination with the environmental heating source, certain specific embodiments use a Stirling engine. A Stirling engine is a type of hot-air engine, examples of which have been used to produce mechanical and electrical power from high-temperature heat sources such as hydrocarbon combustion or nuclear fission. Recently, it has been shown to be commercially feasible to use concentrated sunlight to power an air engine to successfully generate electricity. These methods use temperature gradients across the air engine in excess of 300° C.

As used herein, a "thermodynamic engine" refers more generally to any device or system capable of converting thermal energy to a different form of energy. Examples of thermodynamic engines include engines like external and internal combustion engines that effect an energy conversion between mechanical energy and a temperature differential; and engines like thermoelectric, pyroelectric, and thermophotovoltaic engines that effect a conversion between electrical energy and a temperature differential.

A Stirling engine is sometimes referred to in the art as an "external combustion engine" and typically operates by burning a fuel source to generate heat that increases the temperature of a working fluid, which in turn performs work. The operation of one type of conventional Stirling engine is illustrated in FIGS. 1A-1E. Each of FIGS. 1A-1D shows the configuration of the Stirling engine 100 at a different position during a single cycle, with the engine 100 operating by changing positions sequentially from FIG. 1A to FIG. 1D and then returning to the configuration shown in FIG. 1A. The phase diagram shown in FIG. 1E also shows this cycle, but from the perspective of relevant thermodynamic variables. The phase diagram is a pressure-volume diagram, with pressure being plotted on the ordinate and volume being plotted on the abscissa. Relevant isotherms 124 and 128 are shown with dotted lines.

The mechanical energy produced by the Stirling engine 100 is indicated by positions of pistons 112 and 116. To use or retain the energy, the pistons 112 and 116 may be connected to a common shaft that rotates or otherwise moves in accordance with the changes in piston positions that result from operation of the engine 100. A confined space between the two pistons 112 and 116 is filled with a compressible fluid 104, usually a compressible gas. The temperature difference is effected by keeping one portion of the fluid 104, in this instance the portion on the left, in thermal contact with a heat source and by keeping the other portion, in this instance the portion on the right, in thermal contact with a heat sink. With such a configuration, piston 112 is sometimes referred to in the art as an "expansion piston" and piston 116 is sometimes referred to as a "compression piston." The portions of the fluid are separated by a regenerator 108, which permits appreciable heat transfer to take place to and from the fluid 104 during different portions of the cycle described below. This heat transfer either preheats or precools the fluid 104 as it transitions from one chamber to the other.

Figure 1E:
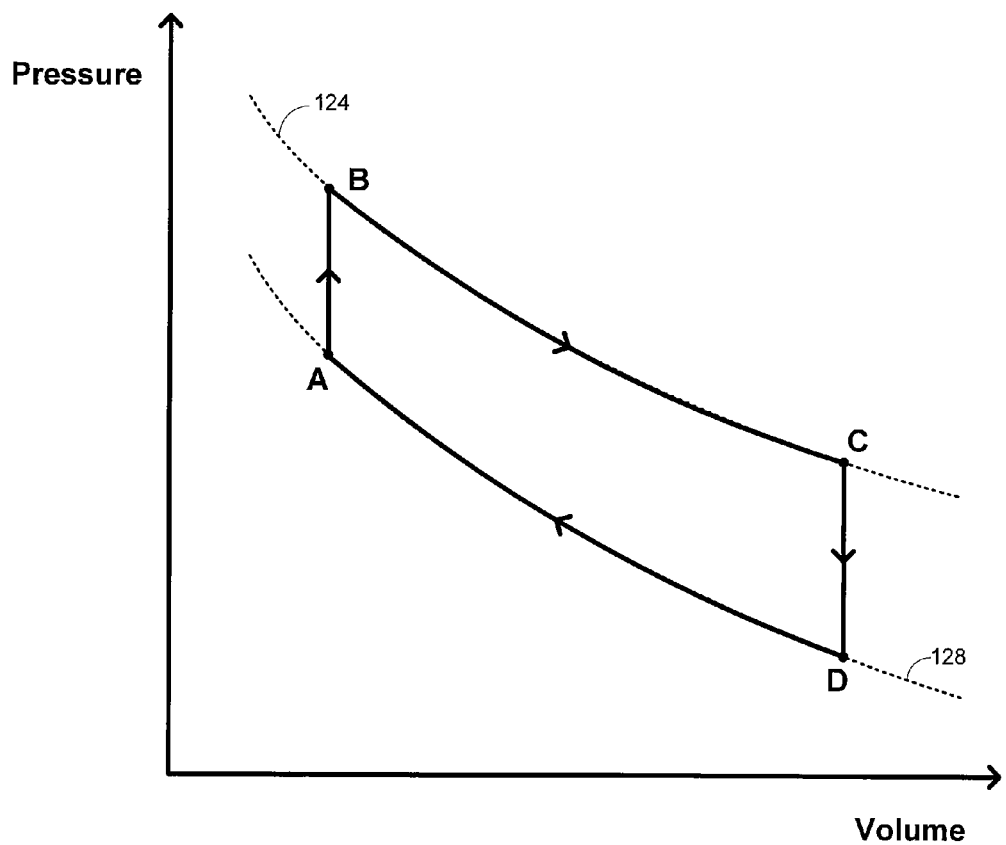
FIG. 1E is a phase diagram showing the thermodynamic operation of the Stirling engine.

When the engine is in the position shown in FIG. 1A, the fluid 104 has a pressure and volume that correspond to point "A" in FIG. 1E. In this phase diagram, isotherm 128 corresponds to a temperature $T_c$ of the cold side and isotherm 124 corresponds to a temperature $T_h$ of the hot side. During the portion of the cycle from FIG. 1A to FIG. 1B, the expansion piston 112 moves down at the same time that the compression piston 116 moves up, maintaining a constant volume for the fluid 104. During such a change, fluid 104 passes through the regenerator 108 from the cold side to the hot side. Heat $Q_R$ supplied by the regenerator 108 causes the fluid to enter the hot side at temperature $T_h$. The constant volume of this part of the cycle is represented by a vertical line in FIG. 1E to point "B."

The transition to the configuration shown in FIG. 1C is achieved by maintaining the compression piston 116 in a substantially fixed position while moving the expansion piston 112 downwards to increase the volume containing the fluid 104. This causes the fluid to undergo a substantially isothermal expansion, as represented in the phase diagram by a traversal along isotherm 124 to point "C." During this expansion, heat $Q_h$ is absorbed into the working fluid at temperature $T_h$ from the thermal contact of the fluid 104 with the heat source. The heat is turned into mechanical work W during this expansion.

The portion of the cycle to FIG. 1D is a counterpart to the portion of the cycle between the configurations of FIGS. 1A and 1B, with both pistons 112 and 116 moving in concert to maintain a substantially constant volume. In this instance, however, fluid is forced in the other direction through the regenerator 108, causing a decrease in temperature to $T_c$ represented by the vertical line in FIG. 1E to point "D." During this part of the cycle, substantially the same amount of heat $Q_R$ absorbed during the transition between FIGS. 1A and 1B is given up to the regenerator 108. The two constant-volume transitions in the cycle accordingly have substantially no net effect on the heat-transfer characteristics of the process.

Finally, a return is made to the configuration of FIG. 1A by moving the compression piston 116 upwards while maintaining the expansion piston 112 in a substantially fixed position. The resulting compression of the fluid 104 is again substantially isothermic, as represented by the traversal along isotherm 128 at temperature $T_c$ in FIG. 1E back to point "A." During this compression, heat $Q_c$ is removed from the working fluid as a result of contact of the fluid 104 with the heat sink.

The net result of the cycle is a correspondence between (1) the mechanical movement of the pistons 112 and 116 and (2) the absorption of heat $Q_h$ at temperature $T_h$ and the rejection of heat $Q_c$ at temperature $T_c$. The work performed by the pistons 112 and 116 is accordingly $W=|Q_h-Q_c|$.

The type of Stirling engine illustrated in FIGS. 1A-1D is a two-piston type of Stirling engine. This type of configuration is sometimes referred to in the art as having an "alpha" configuration. Other configurations for Stirling engines may be implemented that traverse a similar thermodynamic path through the pressure-volume phase diagram of FIG. 1E.

One alternative configuration that is sometimes referred to as having a "beta" type of configuration provides two pistons within a common cylinder and connected with a common crankshaft. Such a configuration is illustrated schematically in FIGS. 2A-2D. The beta Stirling engine 200 comprises a cylinder 216 within which a power piston 208 and a displacer piston 212 may move. Both pistons 208 and 212 are linked with a common flywheel 204. In the configuration in FIG. 2A, the power piston 208 has compressed the working fluid and the displacer piston 212 has moved so that most of the fluid is proximate the hot side where it can be exchanged with a hot heat exchanger.

Figure 2D:
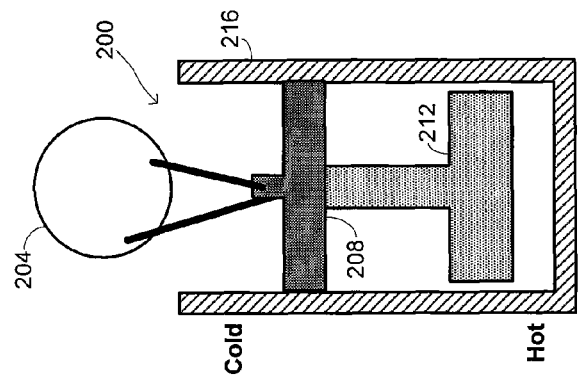
FIGS. 2A-2D show different stages in the operation of a two-displacer-type Stirling engine sometimes described as a beta-type engine.
Figure 2C:
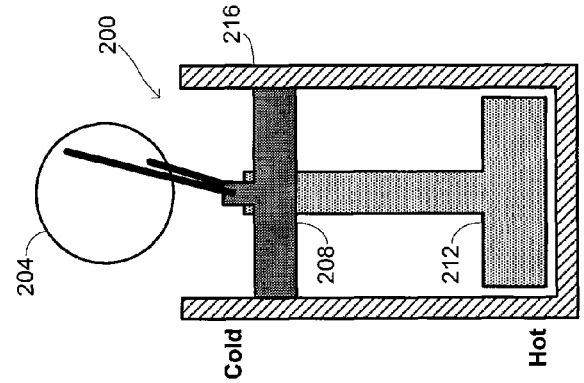
Figure 2B:
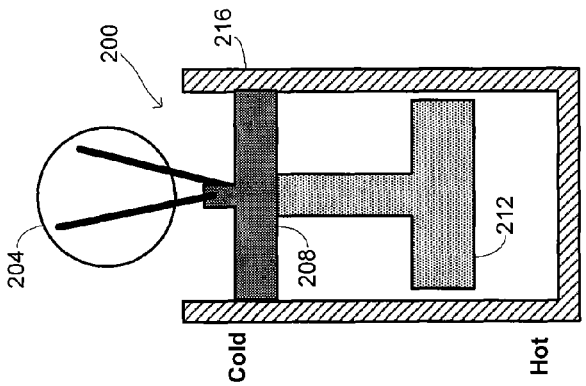
Figure 2A:
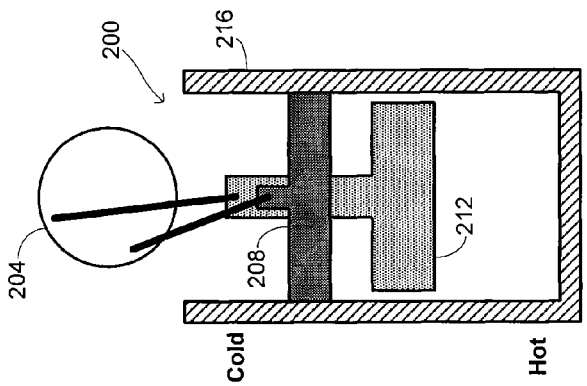

During the power stroke illustrated in FIG. 2B, the heated working fluid pushes the power pistor 208 along the cylinder 216. The displacer piston 212 then moves as illustrated in FIG. 2C to shunt the fluid to the cold side. The cooled fluid is subsequently compressed by the momentum of the flywheel 204.

Another alternative configuration for a Stirling engine uses a displacer-type of engine, an example of which is illustrated schematically in FIGS. 3A-3D. This type of configuration is sometimes referred to in the art as having a "gamma" configuration. The fundamental principle of operation of the displacer type of Stirling engine is the same as for the two-piston type of Stirling engine in that thermal energy represented by a temperature differential is converted to mechanical energy. Fundamentally, the gamma engine is similar to the beta engine except that the power piston and displacer piston are not coaxial.

With the displacer-type of Stirling engine 300, fluid 324 that expands with a heat-energy increase is held within an enclosure that also includes a displacer 328. To simplify the illustration, a regenerator is not shown explicitly in the drawings, but may be included to improve the efficiency of the engine. The fluid 324 is typically a gas. One or both sides of the engine 300 are maintained in thermal contact with respective thermal reservoirs to maintain the temperature differential across the engine. In the illustration, the top of the engine 300 corresponds to the cold side and the bottom of the engine 300 corresponds to the hot side. A displacer piston 304 is provided in mechanical communication with the displacer 328 and a power piston 308 is provided in mechanical communication with the fluid 324. Mechanical energy represented by the motion of the power piston 308 may be extracted with any of a variety of mechanical arrangements, with the drawing explicitly showing a crankshaft 316 in mechanical communication with both the displacer and power pistons 304 and 308. The crankshaft is illustrated as mechanically coupled with a flywheel 320, a common configuration. This particular mechanical configuration is indicated merely for illustrative purposes since numerous other mechanical arrangements will be evident to those of skill in the art that may be coupled with the power piston 308 in extracting mechanical energy. In these types of embodiments, the displacer 328 may also have a regenerator function to permit heat transfer to take place to and from the fluid 324 during different portions of the cycle. Another arrangement common in these types of embodiments comprises a displacer that forms a seal with the walls of the expansion chamber, and whose motion forces the fluid through guides that lead into the other half of the chamber past a regenerator.

Figure 3A:
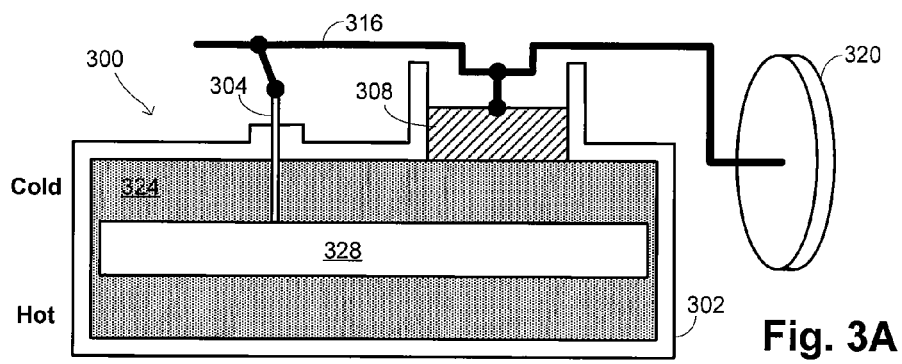
FIGS. 3A-3D show different stages in the operation of a displacer-type Stirling engine sometimes described as a gamma-type engine illustrated without a regenerator.
Figure 3B:
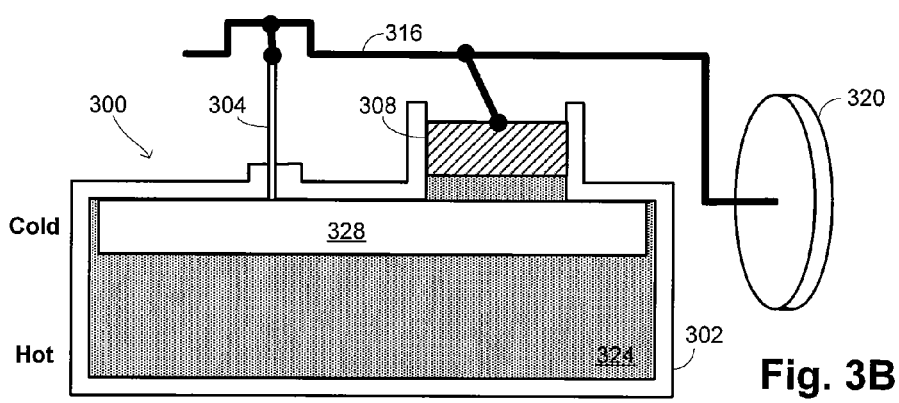

When the displacer Stirling engine 300 is in the configuration shown in FIG. 3A, it has a thermodynamic state corresponding to point "A" in FIG. 1E. Heating of the fluid 324 on the lower side of the engine 300 causes the pressure to increase, resulting in movement of the power piston 308 upwards as illustrated in FIG. 3B. This transition is represented thermodynamically in FIG. 1E with a transition to point "B." With the fluid 324 primarily in contact with the hot side of the engine, expansion of the fluid 324 takes place to drive the power piston 308 further upwards. This transition is substantially isothermic and is illustrated in FIG. 1E with a transition to point "C," corresponding to the arrangement shown in FIG. 3C.

Figure 3C:
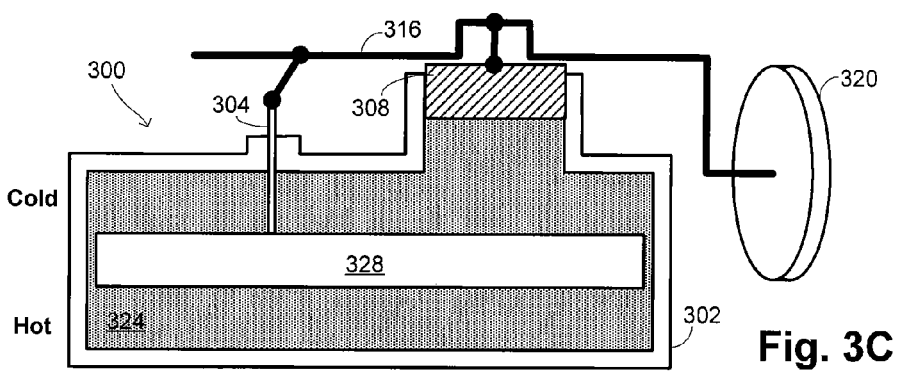
Figure 3D:
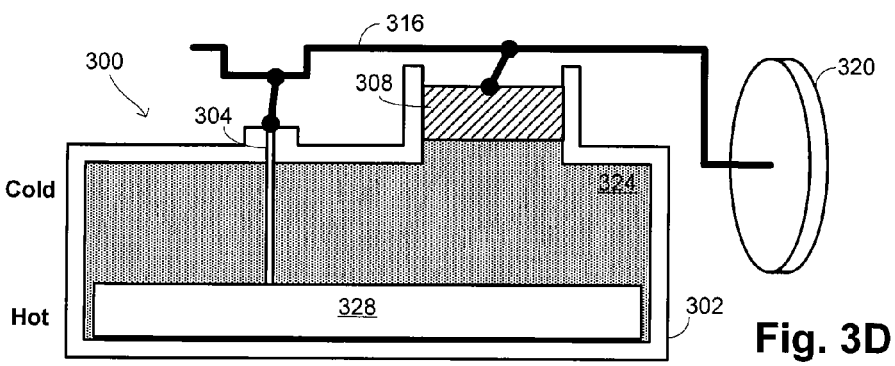

In FIG. 3C, expansion of the fluid 324 has been accompanied by reverse motion of the displacer 328, causes more of the fluid 324 to come in contact with the cold side of the engine 300 and thereby reduce the pressure. This is illustrated in FIG. 1E with the transition to point "D," corresponding to the arrangement shown in FIG. 3D. Cooling of the fluid 324 induces a substantially isothermic contraction illustrated in FIG. 1E with a return to point "A" and with the engine returning to the physical configuration shown in FIG. 3A.

This basic cycle is repeated in converting thermal energy to mechanical energy. In each cycle, the pressure increases when the displacer 328 is in the top portion of the enclosure 302 and decreases when the displacer 328 is in the bottom portion of the enclosure 302. Mechanical energy is extracted from the motion of the power piston 308, which is preferably 90° out of phase with the displacer piston 304, although this is not a strict requirement for operation of the engine.

Other types of thermodynamic engines make use of similar types of cycles, although they might not involve mechanical work. For instance, thermoelectric engines typically exploit the Peltier-Seebeck effect, which relates temperature differentials to voltage changes. Other physical effects that may be used in converting temperature differentials directly to electrical energy include thermionic emission, pyroelectricity, and thermophotovoltaism. Indirect conversion may sometimes be achieved with the use of magnetohydrodynamic effects.

Figure 4:
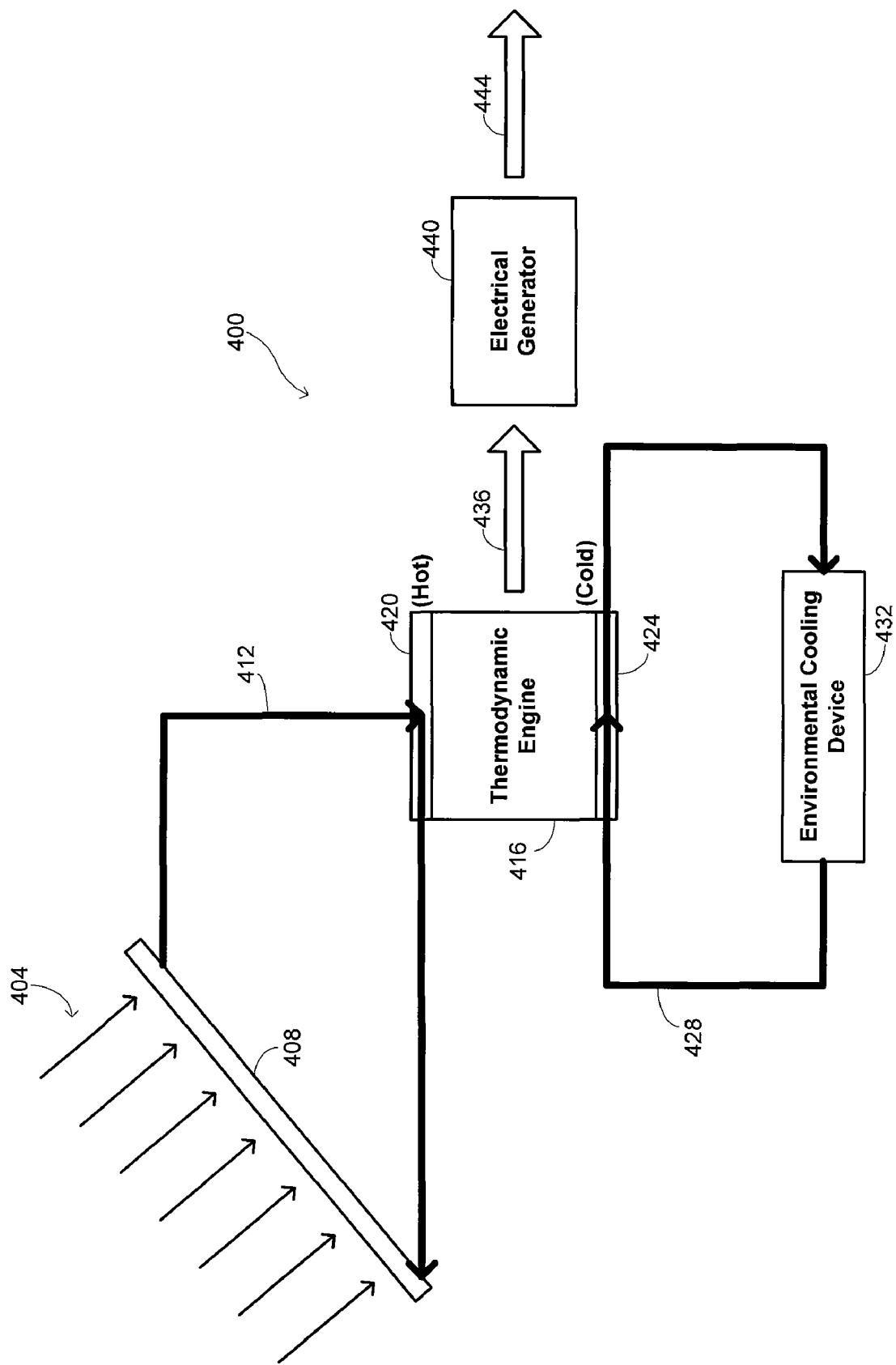
FIG. 4 is a schematic diagram illustrating elements of a system for generating power according to an embodiment of the invention.

A general overview of how the heating- and cooling-loop structures are integrated with a thermodynamic engine to achieve power generation in embodiments of the invention is illustrated schematically in FIG. 4. In the illustrated configuration, the system 400 is organized about a thermodynamic engine 416 over which a temperature differential is defined by a "hot" side 420 and a "cold" side 424, the terms "hot" and "cold" being used only to indicate the relative temperatures and not indicating any particular magnitude for the temperature differential. That is, the hot side 420 has a higher temperature than the cold side 424 of the thermodynamic engine 416. In some embodiments, the temperature difference across the engine 416 is between 30° C. and 250° C., which is generally considered to be a low- to medium-grade temperature difference. With such a low temperature difference, the engine 416 operates at a low energy-conversion efficiency, but this does not prevent the system 400 as a whole from being effective and economical since, particularly in arrangements where the heat source and heat sink are relatively constant in time and relatively large.

In the embodiment illustrated in the drawing, the environmental heating is provided with a solar collection system 408 that collects solar radiation 404. The properties of the collection system 408 may be tailored for different climates in which the system 400 is to operate. The efficiency of the system 400 may depend on such climatic conditions and the ability to use collection systems 408 having different configurations appropriate for such different conditions allows the system 400 as a whole to be operated with greater efficiency. For example, in regions that have cold winter temperatures, an evacuated-tube-type collection system 408 might be used while more temperate parts of the world might benefit more from use of a less-costly flat-plate thermal collection system.

In addition, some level of solar concentration may be implemented by shaping the collector or otherwise concentrating the rays 404.

The environmental heating is placed in thermal communication with the hot side 420 of the thermodynamic engine 416. This may be done by using the solar collection system 408 to heat a solar thermal fluid that is circulated through a conduit 412 that brings the thermal fluid into thermal contact with the hot side 420. When the solar radiation 404 is concentrated, the temperature of the solar thermal fluid may exceed 200° C. or 250° C. depending on the embodiment, although the upper temperature limit in any circumstance is dictated at least in part by the specific configuration of the solar collection system 408.

The cold side 424 of the thermodynamic engine 420 is heat sunk with a cooling loop 428 to an environmental cooling device 432. In some instances, the cooling loop 428 comprises a ground loop so that the cold side 424 of the thermodynamic engine 420 is heat sunk to the ground, sometimes below the frost line. In such embodiments, the environmental cooling device may comprise a ground loop heat exchanger, although other cold sinks may be used in various alternative embodiments. Merely by way of example, these alternative cold sinks might comprise the foundation of a building, a large body of water, pavement, or the like.

The temperature difference established across the thermodynamic engine 416 with the environmental heating and environmental cooling loops in this way may be used to generate energy. In embodiments where the thermodynamic engine 416 generates a nonelectrical form of energy 436, such as when it comprises a Stirling engine that generates mechanical energy, an electrical generator 440 may be provided to convert the nonelectrical energy 436 into electrical energy 444. In embodiments where the thermodynamic engine produces electrical energy directly, such as when it comprises a thermoelectric, pyroelectric, or thermophotovoltaic engine, the electrical generator 440 may not be needed since further conversion of the generated energy is unnecessary.

It will be appreciated that the system 400 is readily amenable to deployment in single- or multi-building settings, both in residential and commercial environments. For example, the system 400 could be deployed as part of a single detached house, providing a relatively inexpensive method of generating electricity for use in running appliances within the house. The basic structure of the system 400 is also readily scalable because the size of the heat sources and heat sinks that are used are so large compared to the size of the system. This permits other embodiments to be used in generating electricity used by much larger structures, such as office buildings, warehouses, apartment buildings, and various other structures.

Figure 5:
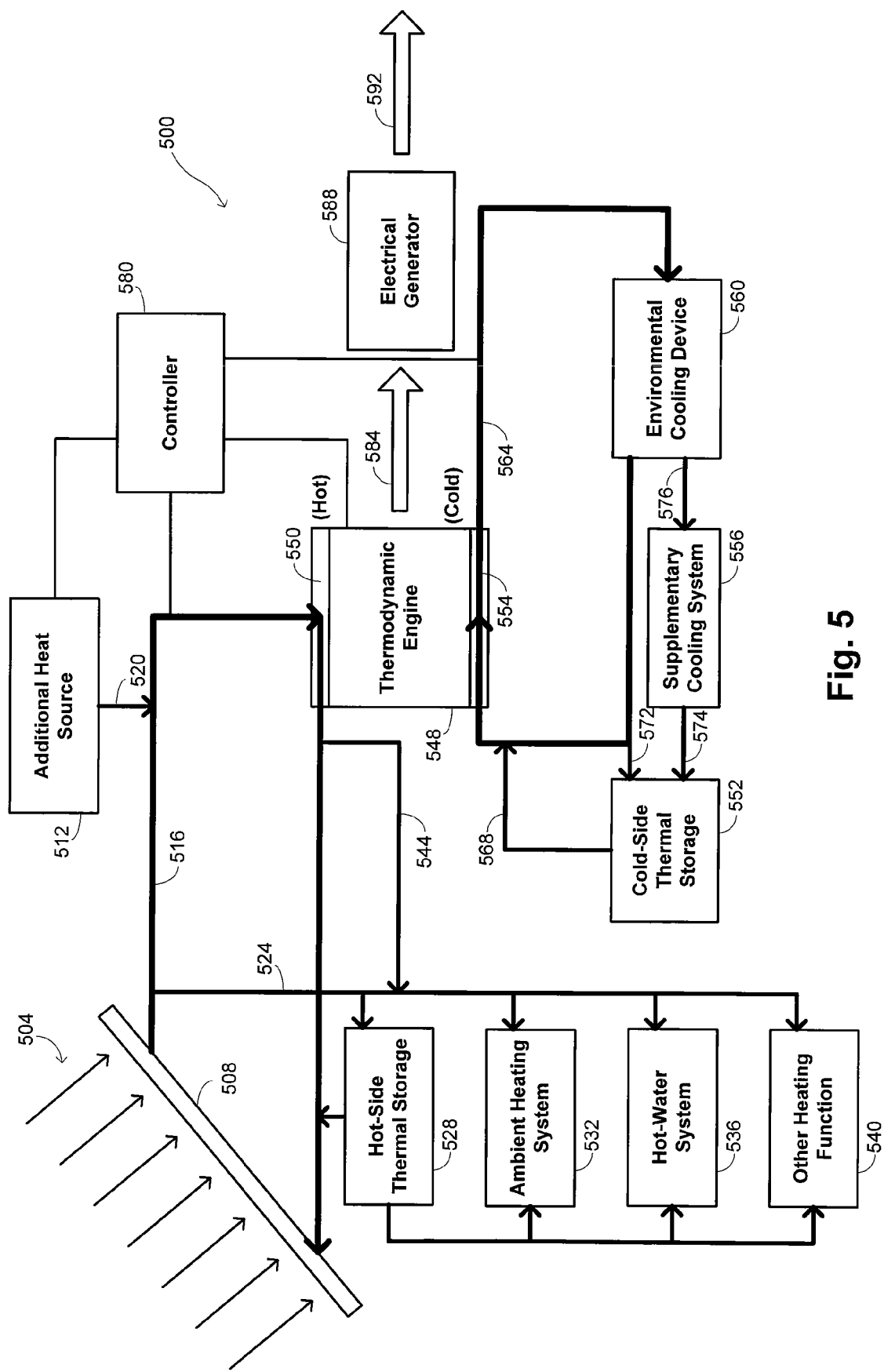
FIG. 5 is a schematic diagram illustration a number of variations on the system of FIG. 4 that may be implemented in certain embodiments.

The basic structure of the system 400 shown in FIG. 4 may be enhanced in a variety of ways, some of which are indicated with the schematic diagram of FIG. 5. This illustration shows a number of different features, not all of which might be included in any particular embodiment. A number of different combinations of the various features are possible, as will be evident from the following description. Specific applications of the system will find certain of the additional features to be of more or less value and differently justified in terms of the impact on physical and financial constraints that might exist.

The basic structure of the system 500 shown in FIG. 5 is similar to that of the system 400 shown in FIG. 4. The system 500 is organized about a thermodynamic engine 548 having a hot side 550 and a cold side 554 that defines a temperature difference across the engine 548. The temperature difference is maintained with environmental heating and cooling loops 516 and 564 respectively provided in thermal communication with the hot side 550 and the cold side 554. Energy 584 generated by the thermodynamic engine 548 may be converted to electrical energy 592 by an electrical generator 588 in embodiments where it is not generated directly as electrical energy. This is true, for example, when the thermodynamic engine comprises a Stirling engine that generates mechanical energy instead of a thermoelectric, pyroelectric, or thermophotovoltaic engine that generates electrical energy.

A number of variants are illustrated in the drawing for both how the environmental heating loop 516 and the environmental cooling loop 564 may be integrated into and interact with the system 500 as a whole. For example, the heating loop 516 may obtain heat from a number of different sources in addition to radiant solar energy 504 collected with a solar thermal collection system 508. Additional heat sources 512 may include the waste heat from any industrial or commercial processes, particularly when the system is deployed in an environment where such processes are operating. The heat from these sources is added to the environmental heating loop 516 with one or more conduits 520 that provide thermal coupling between the additional heat source 512 and the environmental heating loop 516. In some cases, particularly in certain geographical locations, additional heat sources 512 may comprise geothermal heat sources that act to heat the thermal fluid routed by the environmental heating loop to the hot side 550 of the thermodynamic engine 548. As in the embodiment discussed in connection with FIG. 4, the solar energy 504 may be concentrated to increase the magnitude of the temperature differential in some embodiments.

Heat may also sometimes be directed from the environmental heating loop 516 for other purposes. Such redirection may be particularly advantageous when the total heat available exceeds the amount that can be consumed by the thermodynamic engine 548 in generating power. Heat can be redirected from different portions of the environmental heating loop 516 as indicated by conduits 524 and 544. In some instances, the redirected heat may be used to provide heat to an ambient heating system 532 or a hot-water system 536, in addition to various other heating functions indicated generically with block 540. Other applications might include using the excess heat to melt snow and/or ice in cold-weather climates. Even with the ability to redirect heat for these supplementary heating functions, there may sometimes still be excess heat. Embodiments of the invention accordingly also provide for thermal storage 528. There are a variety of techniques known in the art for enabling thermal storage, many of which use phase-change materials, although the most common form of thermal storage still makes use of water thermal-storage systems in which the temperature of the water is raised to store thermal energy. Other high-heat-capacity materials may also be used to provide storage of thermal energy, and various thermochemical storage approaches may be used in some embodiments, one example of which is based on magnesium hydride.

Heat that is stored in the thermal storage system 528 is available to be used for any of the functions that use heat in the overall system 500. For instance, depending on the specific characteristics of the system 500 at a particular time, heat stored in the thermal storage 528 may be directed back to the environmental heating loop 516 to enhance the temperature difference across the thermodynamic engine 548. In particular, the ability to store heat in this way sometimes enables the thermodynamic engine 548 to run substantially continuously during times when solar radiation is not present. This is particularly advantageous to allow the thermodynamic engine 548 to be run at night or during inclement weather when the intensity of the solar radiation is restricted. It may also be used to provide heat the ambient heating system 532, the hot-water system 526, or to provide any other heating function 540 depending on the temperature demands of these different components of the system in comparison to the level of heat stored in the thermal storage 528. In addition, there are embodiments that intentionally store incoming solar heat during the day rather than using the heat to run the engine when the environmental cooling temperature is high. This stored heat is then used to operate the engine after the sun has set when the environmental cooling temperature has decreased, thus increasing the efficiency with which the heat energy is transformed into mechanical work. These embodiments are envisioned, for example, when an air radiator is used in the environmental cooling loop.

A similar thermal storage 552 may also be included in the environmental cooling loop, in addition to other variants that may be used in different embodiments. The cold-side thermal storage 552 may use a similar or different kind of system as the hot-side thermal storage 528 in different embodiments. Each of the hot- and cold-side thermal storage increase the overall capacity factor of the thermodynamic engine 548, with greater increases obtainable by including thermal storage in both environmental loops. The use of thermal storage in this way advantageously allows the overall system to be designed for average loading instead of peak loading, permitting the system 500 to be smaller and more cost effective.

Other variants to the environmental cooling loop 564 may include a supplementary cooling system 556. Examples of such supplementary systems 556 include evaporative coolers, cooling towers, air radiators, and the like. In some embodiments, such a supplementary system 556 is included in addition to the environmental cooling device 560, although it acts as a substitute for the environmental cooling device 560 in other cases. When used in addition to the environmental cooling device 560, these supplementary systems 556 augment the overall performance of the cooling loop 564, improving the conversion efficiency of the thermodynamic engine 548 and enabling higher output powers. In embodiments where multiple of these supplementary systems 556 are included, the individual systems may be enabled and disabled in accordance with seasonal requirements of the location in which the system 500 is disposed. For instance, a building with an evaporative cooler in addition to an environmental cooling device 560 could use the evaporative cooler to augment the ground-loop cooling in warmer months of the year when the evaporative cooling could be applied within a structure like a house or office for space conditioning.

Thermal flow within the environmental cooling loop 564 as indicated may proceed in a number of different ways indicated in the drawing. For instance, thermal energy may be directed from the environmental cooling device along conduit 576 to the supplementary cooling system 556 and then along conduit 574 to the cold-side thermal storage 552, or may be directed directly to the cold-side thermal storage 552 along conduit 572. When desired, conduit 568 may be used to retrieve thermal energy from the cold-side thermal storage 552 back into the environmental cooling loop 564.

In some embodiments, the system may be equipped with a plurality of temperature sensors distributed at different points within the system 500 and/or the system 500 may comprise a plurality of solar collectors 508 having a set of valves on pipes that connect the collectors 508. The drawing shows a controller 580 coupled with various system components, although additional connections that are not explicitly shown to avoid cluttering the drawing may also be included. In such embodiments, the plurality of solar collectors 508 are interconnected such that modifications may be made by the controller 580 to alter the configuration of the system to account for the specific thermal characteristics of the system 500 at any point in time. Merely by way of example, such a configuration could be used to account for the fact that during some parts of a day, the collectors 508 may be producing more heat energy than the thermodynamic engine 548 can consume to generate electrical power, with the control system 580 then directing the heated fluid from a subset of the collectors 508 into the thermal storage 528 to conserve this thermal energy.

During other parts of the day when the collectors are producing less heat output, the control system 580 could then modify the state of the system 500 so that the valves direct all of the thermal energy from the collectors 508 to the thermodynamic engine 548. During night-time hours, the control system 580 could then again reconfigure the state of the system 500 to extract heat energy from the thermal storage 528 and direct it to the thermodynamic engine 548. The control system 580 can similarly control which among the available cooling elements 556 and 560 is used and to what degree to maximize the overall efficiency of the system 500.

Other connections with the control system 580 may be used to alter the manner in which thermal energy is directed to the various other thermal components, such as to the ambient heating system 532, to the hot-water system 536, or to other heating functions 540 used by the system 500. More generally, the control system 580 may be used to define a variety of different states of the system 500 that make use of its different capabilities to satisfy the various thermal demands of the system 500 in the most efficient or cost-effective manner possible.

Figure 6:
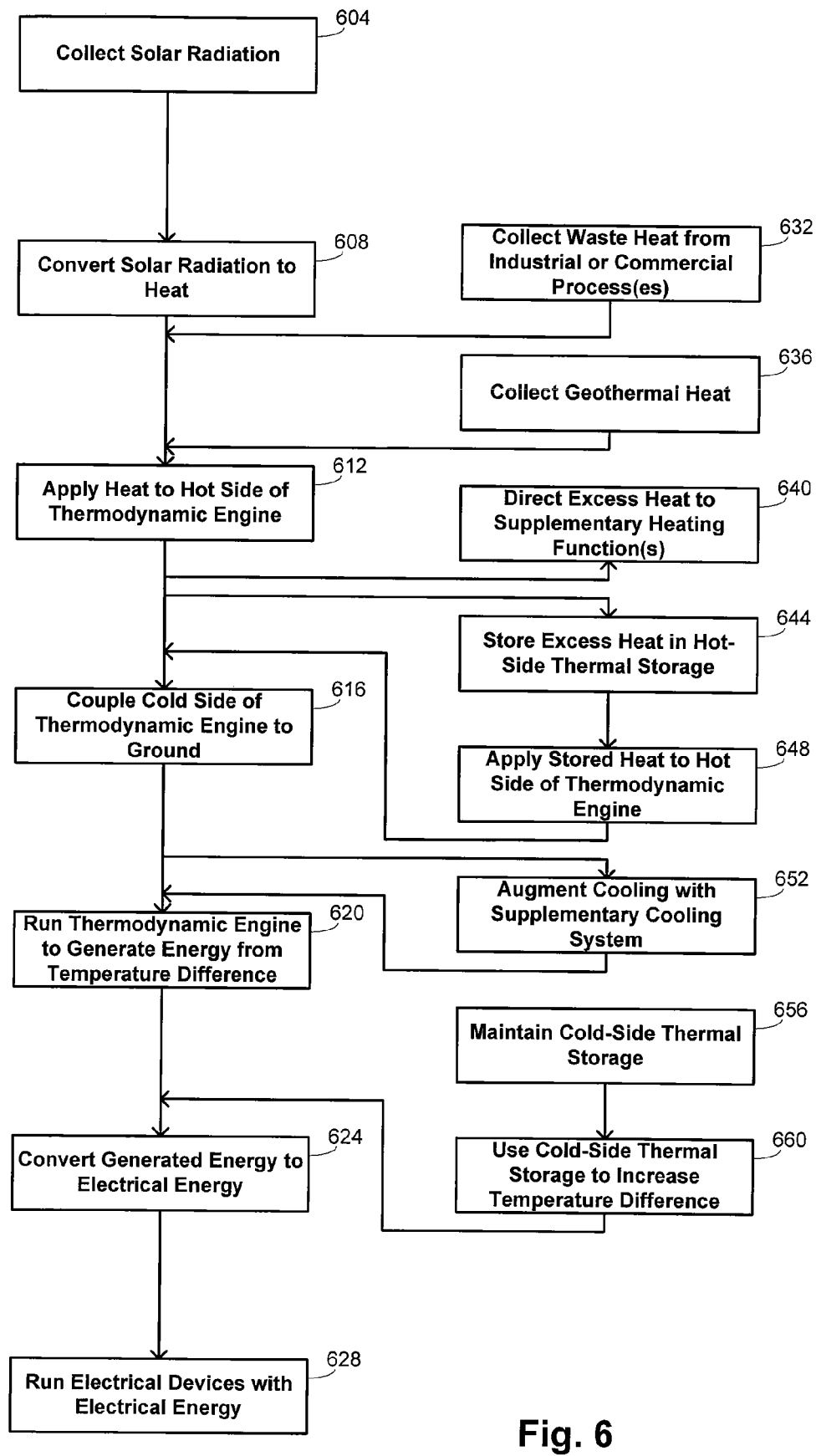
FIG. 6 is a flow diagram summarizing methods of generating power in different embodiments of the invention.

The final drawing, FIG. 6, is a flow diagram that summarizes these various functionalities in the form of a flow diagram. The flow diagram is structured so that the left column defines the basic process that corresponds to what may be implemented using the system shown in FIG. 4. The various blocks in the right column define aspects of the additional functionalities that may be implemented with some of the components shown in the system of FIG. 5.

The basic process begins at block 604 with the collection of solar radiation, which may be converted to heat at block 608. This heat is applied to the hot side of the thermodynamic engine at block 612. The cold side of the thermodynamic engine is coupled to ground as indicated at block 616, permitting the thermodynamic engine to be run at block 620 using the temperature difference established across the engine to generate energy. This energy is converted to electrical energy at block 624 if the thermodynamic engine is of a type that does not produce electrical energy directly. The electrical energy produced in this way may be used at block 628 to run any of a variety of electrical devices.

One additional function indicated at block 632 is the collection of waste heat from industrial or commercial processes that may be added to the heat generated from the collection of solar radiation. Block 636 similarly indicates the collection of geothermal heat that may also be added to the heat generated from the collection of solar radiation. Conversely to the collection of additional heat in this way may be the redirection of excess heat to supplementary heating functions as indicated at block 640 and/or the storage of excess heat in a hot-side thermal storage at block 644. This stored heat may be applied when desired to the hot side of the thermodynamic engine at block 648 or may be used for other purposes when appropriate.

The various additional functions that may be implemented on the cold side of the thermodynamic engine are also indicated. For example, block 652 indicates that the cooling may be augmented through the use of a supplementary cooling system. And block 656 indicates that a cold-side thermal storage may be maintained, allowing it to be used to increase the temperature difference at block 660.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of generating power, the method comprising:
    providing a thermodynamic engine configured to convert heat provided in the form of a temperature difference to a nonheat form of energy;
    directing heat through a heating loop in thermal contact with a first side of the thermodynamic engine;
    directing at least a portion of the heat from the heating loop to a supplementary heating function after making contact with the first side of the thermodynamic engine;
    coupling a second side of the thermodynamic engine different from the first side to an environmental cooling loop in thermal contact with an environmental cooling device;
    operating the thermodynamic engine to dispense heat from the second side of the thermodynamic engine through the environmental cooling loop into the environmental cooling device;
    whereby operation of the thermodynamic engine generates the nonheat form of energy from the temperature difference thereby established between the first side and the second side of the thermodynamic engine.

2. The method recited in claim 1 wherein directing heat comprises:
    collecting solar radiation;
    converting the solar radiation to heat; and
    directing the converted solar radiation through the heating loop.

3. The method recited in claim 2 wherein directing heat further comprises:
    collecting waste heat from an industrial or commercial process; and
    directing the collected waste heat through the heating loop.

4. The method recited in claim 2 wherein directing heat further comprises:
    collecting geothermal heat; and
    directing the collected geothermal heat through the heating loop.

5. The method recited in claim 1 wherein directing heat comprises storing a portion of the heat in a thermal storage device.

6. The method recited in claim 5 wherein directing heat further comprises directing heat from the thermal storage device through the heating loop.

7. The method recited in claim 5 wherein directing heat further comprises directing heat to a supplementary heating function different from the heating loop and different from the thermal storage device.

8. The method recited in claim 7 further comprising modifying a relative distribution of heat directed through the heating loop, stored in the thermal storage device, and directed to the supplementary heating function.

9. A method of generating power, the method comprising:
    providing a Stirling engine configured to convert heat provided in the form of a temperature difference to a nonheat form of energy; directing heat through a heating loop in thermal contact with a first side of the Stirling engine, wherein directing heat comprises directing at least a portion of the heat from the heating loop to a supplementary heating function after making contact with the first side of the Stirling engine; coupling a second side of the Stirling engine different from the first side to an environmental cooling loop in thermal contact with an environmental cooling device; operating the Stirling engine to dispense heat from the second side of the Stirling engine through the environmental cooling loop into the environmental cooling device; whereby operation of the Stirling engine generates the nonheat form of energy from the temperature difference thereby established between the first side and the second side of the Stirling engine.

10. The method recited in claim 1 wherein the environmental cooling device comprises a device selected from the group consisting of a ground loop chiller, an air-radiation device, a building foundation, a body of water, pavement, and concrete.

11. The method recited in claim 1 further comprising maintaining a thermal storage device in thermal contact with the environmental cooling loop.

12. The method recited in claim 1 wherein the thermodynamic engine comprises a Stirling engine configured to convert the heat provided in the form of the temperature difference to mechanical energy, the method further comprising converting the mechanical energy to electrical energy.

13. A method of generating power, the method comprising:
    providing a Stirling engine configured to convert heat provided in the form of a temperature difference to mechanical energy;
    collecting solar radiation;
    converting the solar radiation to heat;
    storing a first portion of the converted solar radiation in a thermal storage device;
    directing a second portion of the converted solar radiation through a heating loop in thermal contact with a first side of the Stirling engine, wherein directing the second portion of the converted solar radiation comprises directing at least a portion of the second portion of the converted solar radiation to a supplementary heating function different from the heating loop; after making contact with the first side of the Stirling engine.
    coupling a second side of the Stirling engine different from the first side to an environmental cooling loop in thermal contact with an environmental cooling device;
    operating the Stirling engine to dispense heat from the second side of the Stirling engine through the environmental cooling loop into the environmental cooling device; and
    converting mechanical energy generated by operation of the Stirling engine from the temperature difference thereby established between the first side and the second side into electrical energy.

14. The method recited in claim 13 further comprising modifying a relative distribution of the first portion and the second portion.

15. A system for generating power, the system comprising:
    a thermodynamic engine configured to convert heat provided in the form of a temperature difference to a nonheat form of energy;
    a heating loop in thermal contact with a first side of the thermodynamic engine;
    a heating conduit configured to receive heat from the heating loop after heat makes contact with the first side of the thermodynamic engine and to deliver the heat to a supplementary heating function;
    a source of heat in thermal contact with the heating loop;

an environmental cooling loop in thermal contact with a second side of the thermodynamic engine different from the first side; and an environmental cooling device in thermal contact with the environmental cooling loop.

16. The system recited in claim 15 wherein the source of heat comprises a solar thermal collector.

17. The system recited in claim 16 wherein the source of heat further comprises waste heat from an industrial or commercial process.

18. The system recited in claim 16 wherein the source of heat further comprises geothermal heat.

19. The system recited in claim 15 further comprising a thermal storage device in thermal communication with the heating loop and/or in thermal communication with the environmental cooling loop.

20. The system recited in claim 19 further comprises a supplementary thermal device that operationally uses heat.

21. The system recited in claim 20 further comprising a controller configured to modify a relative distribution of heat directed through the heating loop, stored in the thermal storage device, and directed to the supplementary thermal device.

22. The system recited in claim 15 wherein the environmental cooling device comprises a device selected from the group consisting of a ground loop chiller, an air-radiation device, a building foundation, a body of water, pavement, and concrete.

23. The system recited in claim 15 wherein the thermodynamic engine comprises a Stirling engine configured to convert the heat provided in the form of the temperature difference to mechanical energy, the system further comprising an electrical generator configured to convert the mechanical energy to electrical energy.

24. A system for generating power, the system comprising:
a Stirling engine configured to convert heat provided in the form of a temperature difference to mechanical energy;

a solar thermal collector configured to convert collected solar radiation to heat;

a thermal storage device configured to store a first portion of the converted solar radiation;

a heating loop in thermal contact with a first side of the Stirling engine to direct a second portion of the converted solar radiation to the first side and to direct at least a portion of the second portion to a supplementary heating function after the at least the portion of the second portion makes thermal contact with the first side ;

an environmental cooling loop in thermal contact with a second side of the thermodynamic engine different from the first side;

an environmental cooling device in thermal contact with the environmental cooling loop; and an electrical generator in communication with the Stirling engine to convert mechanical energy generated by operation of the Stirling engine from the temperature difference thereby established between the first side and the second side into electrical energy.

25. The system recited in claim 24 further comprising a controller configured to modify a relative distribution of the first portion and the second portion.

26. The method recited in claim 1, wherein the temperature difference is substantially between 30° C. and 250°C.

27. The system recited in claim 15, wherein the temperature difference is substantially between 30° C. and 250°C.

28. The method recited in claim 13, wherein a temperature of the second portion of the converted solar radiation is substantially between 200° C. and 250°C.

29. The system recited in claim 24, wherein a temperature of the second portion of the converted solar radiation to the first side is substantially between 200° C. and 250°C.

* * * * *